United States Patent
Alangari

(10) Patent No.: US 12,059,320 B1
(45) Date of Patent: Aug. 13, 2024

(54) MULTIFUNCTIONAL ADJUSTABLE TOOTH HOLDER FOR TOOTH CUTTING DEVICE

(71) Applicant: KING SAUD UNIVERSITY, Riyadh (SA)

(72) Inventor: Sarah Sultan Alangari, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/511,797

(22) Filed: Nov. 16, 2023

(51) Int. Cl.
*B25B 1/00* (2006.01)
*A61C 1/14* (2006.01)
*A61C 5/82* (2017.01)
*A61C 13/12* (2006.01)
*B25B 5/10* (2006.01)

(52) U.S. Cl.
CPC ............ *A61C 5/82* (2017.02); *A61C 1/14* (2013.01); *A61C 13/12* (2013.01); *B25B 5/10* (2013.01)

(58) Field of Classification Search
CPC .......... B25B 1/00; B25B 1/2452; B25B 5/00; B25B 5/06
See application file for complete search history.

(56) References Cited

U.S. PATENT DOCUMENTS

| | | | |
|---|---|---|---|
| 3,580,459 A * | 5/1971 | Gage | B23K 20/12 269/56 |
| 3,913,230 A | 10/1975 | Weiss | |
| 4,501,556 A | 2/1985 | Zelnigher | |
| 4,573,917 A | 3/1986 | Erickson | |
| 4,624,639 A | 11/1986 | Wong | |
| 8,210,510 B2 * | 7/2012 | Li | B25B 5/10 269/291 |
| 8,998,190 B2 * | 4/2015 | Winn | B25B 1/2405 269/282 |
| 9,004,476 B2 * | 4/2015 | Schmidt | B25B 1/2463 269/282 |
| 2019/0167403 A1 | 6/2019 | Reynafarje Reyna | |
| 2019/0389036 A1 * | 12/2019 | Taylor | B25B 1/2452 |
| 2022/0104928 A1 | 4/2022 | Hayashi | |
| 2022/0257409 A1 | 8/2022 | Radmand | |

* cited by examiner

*Primary Examiner* — Lee D Wilson
(74) *Attorney, Agent, or Firm* — Nath, Goldberg & Meyer; Joshua B. Goldberg

(57) ABSTRACT

A device for positioning and stabilizing individual teeth during laboratory research for cutting or crown removal. The device includes an adjustable bar having a first side wall and a second side wall located opposite the first side wall. An adjustment mechanism is located on the second side wall. The adjustment mechanism is adjustable in a direction perpendicular to the first side wall. A plate is located between the first side wall and the second side wall. A height adjusting screw is located at the bottom of the adjustable bar moving the plate in a vertical direction adjusting the height of the plate. A first tilt screw is located at an opposite end of the adjustable bar as a second tilt screw allowing for rotation of the adjustable bar around the first and second tilt screws.

8 Claims, 2 Drawing Sheets

MULTIFUNCTIONAL ADJUSTABLE TOOTH HOLDER FOR TOOTH CUTTING DEVICE

BACKGROUND

1. Field

The present disclosure relates to dental laboratory research, and particularly to a holder for a tooth cutting device.

2. Description of the Related Art

Dental research is focused on in-vitro studies as they are highly standardized with better control over variables. Preparation of teeth is the backbone in the majority of in-vitro dental research as it creates specimens from teeth to test several research factors. However, the process of cutting teeth is a difficult and lengthy process, as teeth are not fixed in size and have different anatomical variations, which consumes time by adjusting each sample in a different location and angulation prior to cutting them.

One technique used in laboratory settings for cutting dental teeth, is to attach the teeth to a glass/acrylic slab using hot melted wax, or super glue. However, this technique involves many variables that may lead to improper sample sectioning and result in discarding valuable human teeth and destroying expensive diamond wafer cutting blades. These shortcomings include the following:

1. Sample instability, as teeth may detach from the wax or super glue due to the vibration from the cutting device, resulting in re-doing the process of attachment. This is not only time-consuming but may affect the quality of cutting as the next cut of the blade may not be in the exact previous one (in location and angulation), resulting in removing more structure and incorrect cutting.
2. Loss of expensive (~1000$) diamond wafer cutting blades, as any change in tooth location during the cutting process (no proper attachment, vibration of the device, etc.) harms the tips of the blades, resulting in the need to replace it with another one.
3. Loss of samples, as teeth are delicate and small structures. During the cutting process, samples may get detached and lost, in such case, it is replaced by a new tooth and the process is restarted from the beginning.
4. After cutting the samples, the residual glue/wax used to stabilize the samples may not be removed completely and affect the nature of the tested dental surfaces.
5. As teeth have different anatomical convexities and concavities, titling the samples at a specific angle is a must to produce uniform equal cut areas. The process of tilting and adjusting the samples in a direction that the operator wants and to secure the sample in that exact position, prior to cutting, is challenging and almost difficult to produce using the previous technique (requires melting and adding wax each time to reposition or add wax if previous wax was softened due to room temperature).
6. Measuring the area to be prepared before using the cutting device is difficult.
7. Considering the previous points, it is time-consuming.

SUMMARY

There is a need for a tool that allows for stabilizing, tilting, and measuring the amount of tooth needed to be prepared prior to cutting or crown removal in a simple and efficient manner. A device of the present subject matter includes 1) a stainless-steel rectangular-metal base, having 2) a horizontal metal table/plate (freely moving and rotates fully 180°), which is on top of the metal base. The horizontal metal table is engraved with numbers in numerical order (ruler on the top and side) to measure the tooth height and width before, during and after the cutting procedure. To overcome the problem of instability and loss of samples, the metal plate includes two side screws which are tightened until they engage the sides of the tooth to stabilize it by pushing it towards the opposite wall.

The stabilized tooth rests on a horizontal metal plate that is attached to the base by a small rotating hinge to allow for tilting freely (upwards, sideways, and downwards), and has a protractor to measure the tilt and keep it as a reference if repeated tooth cuts are needed. This allows for the adjustment of teeth angulation and horizontal rotation in this device. On both sides of the plate, there are 3) two screws attached to the plate to stabilize it in the desired tilt. This allows for a precise thickness of the cut samples, and eliminates difficulties faced in multiple repositioning of the sample during the cutting process. The table can be moved in a circular horizontal motion, so the stabilized tooth can be cut using different horizontal and vertical cuts. Furthermore, the base includes 4) one side grip (with two screw holes) to facilitate the easiness of holding the device directly to the cutting machine.

In summary, this simple tool allows for a time-efficient, fast, and precise production of standardize and uniform dimensions of in-vitro dental samples.

A multifunctional adjustable tooth holder for a tooth cutting system, in one embodiment, includes an adjustable bar having a first side wall and a second side wall located opposite the first side wall. An adjustment mechanism is located on the second side wall. The adjustment mechanism is adjustable in a direction perpendicular to the first side wall. A plate is located between the first side wall and the second side wall. A height adjusting screw is located at the bottom of the adjustable bar, the height adjusting screw moving the plate in a vertical direction adjusting the height of the plate. A first tilt screw is located at an opposite end of the adjustable bar and a second tilt screw allows for rotation of the adjustable bar around the first and second tilt screws.

The adjustment mechanism includes a first jaw and a first side screw attached to the first jaw through the second side wall; and a second jaw and a second side screw attached to the second jaw through the second side wall.

The holder further includes a base having a first post and a second post. The first tilt screw is attached to the adjustable bar through the first post and the second tilt screw is attached to the adjustable bar through the second post. The base further includes a side grip for attachment to a cutting device. The side grip includes a first cutting device securing screw and a second cutting device securing screw.

The plate is serrated to prevent slippage of a tooth and includes an engraved ruler extending from the first side wall to the second side wall. The plate further includes an engraved ruler extending parallel to the first side wall and the second side wall.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The current disclosure is related mainly to the field of laboratory (in-vitro) dental research. The device of the present disclosure will provide an easy, time-efficient tool to stabilize, tilt, and measure the amount of tooth needed to be prepared prior to cutting or crown removal in order to produce uniform samples with similar dimensions in a time efficient manner.

Figure 1A:
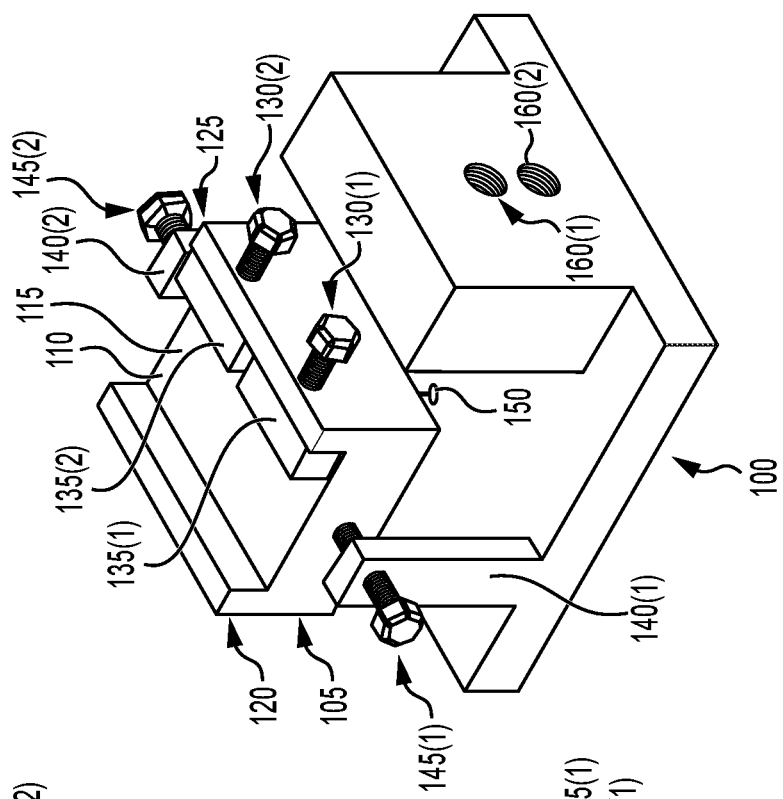
FIG. 1A is a top exploded side view of a multifunctional adjustable tooth holder for tooth-cutting devices.
Figure 1B:
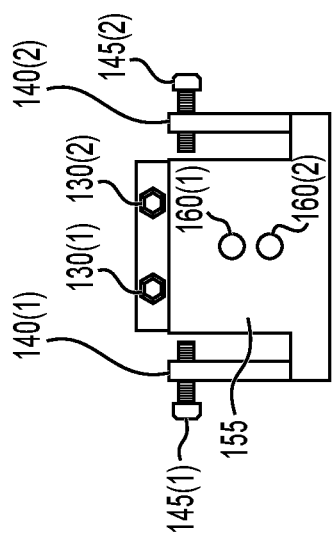
FIG. 1B is a side view of the multifunctional adjustable tooth holder for tooth-cutting devices.
Figure 1C:
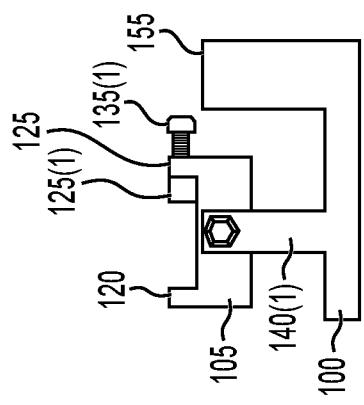
FIG. 1C is back view of the multifunctional adjustable tooth holder for tooth-cutting devices.
Figure 1D:
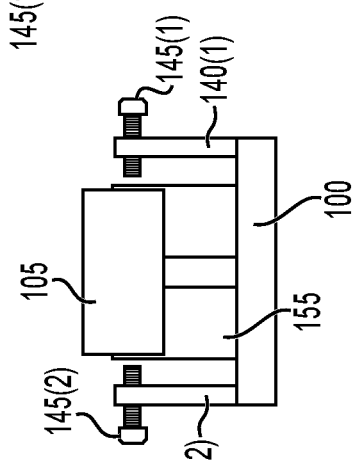
FIG. 1D is a top view of the multifunctional adjustable tooth holder for tooth-cutting devices.
Figure 1E:
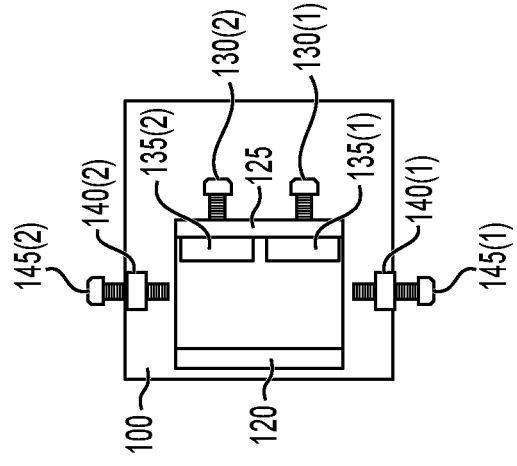
FIG. 1E is a front view of the multifunctional adjustable tooth holder for tooth-cutting devices.

The current device, as illustrated in FIGS. 1A, 11B, IC, 1D and 1E, includes a stainless-steel rectangular-metal base 100 (non-limiting example height: 26 mm, and length: 45 mm). An adjustable stainless-steel rectangular horizontal serrated (to prevent slippage of the teeth) metal plate 105 is located on top of the base 100, (non-limiting example height: 13 mm, width: 24 mm, and length: 27 mm) and serves as the place where teeth rest on top. Serrated metal plate 105 has an engraved ruler on the side 110 (27 mm) and top 115 (24 mm). Serrated metal plate 105 has side walls 120, 125 (non-limiting example height: 4 mm, and 3 mm width). One side 120 is blunt and the other side 125 has 2 screws 130(1), 130(2) with attached jaws 135(1), 135(2) (width: 12 mm) to stabilize a tooth. Serrated metal plate 105 is attached to a movable hinge, bars 140(1), 140(2) located at the center of the metal base 100. The hinge allows for easily tilting the tooth angulation (up and down motion), and circular motion (1800), before stabilizing it using side screws 145(1), 145(2). Furthermore, the movable screw 150 at the bottom controls the height of the plate 105, especially when teeth are titled at acute angles.

Each of the jaws 135(1), 135(2) has a screw 130(1), 130(2) on one side (and disposable plastic/rubber end-holder on an opposite side which can be cut with the tooth) that move until engaging the tooth to stabilize the tooth on the blunt side of the wall 120, after which the screw 130(1), 130(2) is tightened. This allows for stabilizing and measuring the sample teeth prior to cutting.

On the upper and lower sides of the serrate metal plate 105, there are two bars 140(1), 140(2) attached to the base 100 using side screws 145(1), 145(2) to stabilize in the final desired tilt (non-limiting example height: 26 mm, and width: 6 mm).

Figure 2:
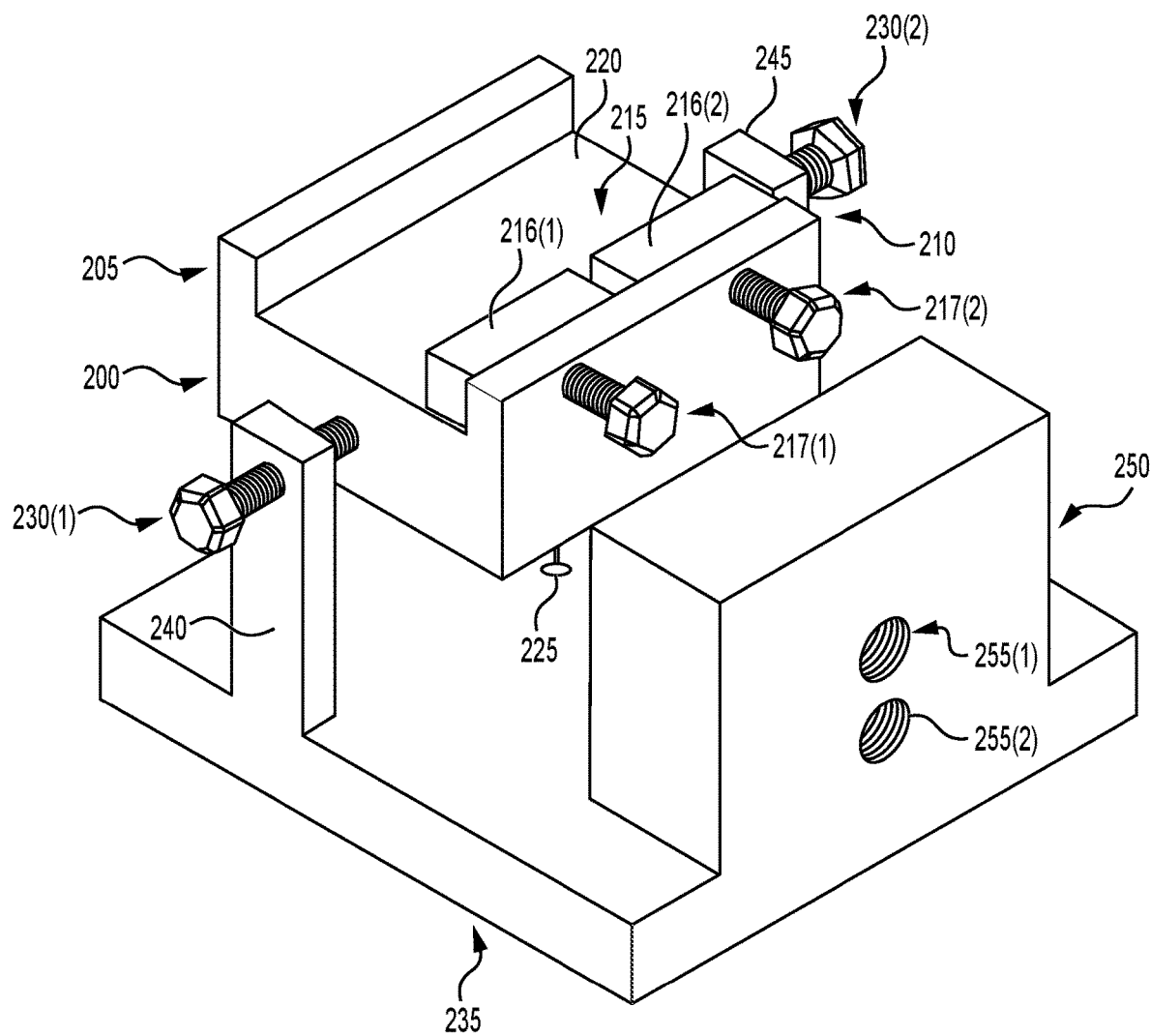
FIG. 2 is a top exploded side view of a multifunctional adjustable tooth holder for tooth-cutting devices.

A side-grip 155 (non-limiting example height: 26 mm, width: 11 mm, and length: 28 mm) is used to attach and stabilize the base 100 directly to a cutting machine using two universal screw holes 160(1), 160(2) (Ø4.25 tm) and attach it to the cutting device. The choice of the screw (upper or lower) depends on the needs of the operator when cutting, FIG. 2 is an illustration of a top and exploded side view of a multifunctional adjustable holder for tooth-cutting devices. Multifunctional adjustable holder includes an adjustable bar 200 having a first side wall 205 and a second side wall 210 located opposite the first side wall 205. An adjustment mechanism 215 is located on the second side wall 210. The adjustment mechanism 215 is adjustable in a direction perpendicular to the first side wall 205. A plate 220 is located between the first side wall 205 and the second side wall 210. A height adjusting screw 225 is located at the bottom of the adjustable bar 200 moving the plate 220 in a vertical direction adjusting the height of the plate 220. A first tilt screw 230(1) is located at one end of the adjustable bar 200. A second tilt screw 230(2) is located at an opposite end of the adjustable bar 200 as the first tilt screw, thus allowing for rotation of the adjustable bar 200 around the first and second tilt screws 230(1), 230(2).

The adjustment mechanism 215 includes a first jaw 216(1) and a first side screw 217(1) attached to the first jaw 216(1) through the second side wall 210; and a second jaw 216(2) and a second side screw 217(2) attached to the second jaw 216(2) through the second side wall 210.

The holder further includes a base 235 having a first post 240 and a second post 245. The first tilt screw 230(1) is attached to the adjustable bar 200 through the first post 240 and the second tilt screw 230(2) is attached to the adjustable bar 200 through the second post 245. The base 235 further includes a side grip 250 for attachment to a cutting device. The side grip 250 includes a first cutting device securing screw 255(1) and a second cutting device securing screw 255(2).

The plate 220 is serrated to prevent slippage of a tooth and includes an engraved ruler extending from the first side wall 205 to the second side wall 210. The plate 220 further includes an engraved ruler extending parallel to the first side wall 205 and the second side wall 210.

In one embodiment, the base 235 can be stainless-steel (height: 26 mm, and length: 45 mm). It includes an adjustable moving metal bar 200 (height: 13 mm, width: 24 mm, and length: 27 mm), with engraved numerical values (ruler) and two side walls 205, 210 (height: 4 mm, and 3 mm width), one attached with 2 side screws 217(1), 217(2). The plate tilt is stabilized by upper and lower sides screws 230(1), 230(2) (height: 26 mm, and width: 6 mm). A side-grip 250 (height: 26 mm, width: 11 mm, and length: 28 mm), with 2 screw holes 255(1), 255(2) (Ø4.25 mm) stabilize the base 235 to a cutting machine.

While stainless steel is one metal to be used with the components herein, it is contemplated that other suitable metals may also be used.

It is to be understood that the multifunctional adjustable tooth holder for a tooth cutting system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A multifunctional adjustable tooth holder for a tooth cutting system, the holder comprising:
   a base having a first post and a second post, wherein a first tilt screw is attached to an adjustable bar through the first post and a second tilt screw is attached to the adjustable bar through the second post;
   the adjustable bar having a first side wall and a second side wall located opposite the first side wall;
   an adjustment mechanism located on the second side wall, the adjustment mechanism being adjustable in a direction perpendicular to the first side wall;

a plate located between the first side wall and the second side wall;

a height adjusting screw located at a bottom of the adjustable bar moving the plate in a vertical direction adjusting the height of the plate; and the first tilt screw and the second tilt screw located opposite the first tilt screw, the first tilt screw located at an opposite end of the adjustable bar as the second tilt screw, allowing for rotation of the adjustable bar around the first and second tilt screws.

2. The holder as recited in claim 1, wherein the adjustment mechanism comprises:

a first jaw and a first side screw attached to the first jaw through the second side wall; and a second jaw and a second side screw attached to the second jaw through the second side wall.

3. The holder as recited in claim 1, wherein the first tilt screw is attached to the adjustable bar by being threaded through the first post and the second tilt screw is attached to the adjustable bar by being threaded through the second post.

4. The holder as recited in claim 3, wherein the base further comprises a side grip for attachment to a cutting device.

5. The holder as recited in claim 4, wherein the side grip comprises a first cutting device securing screw and a second cutting device securing screw.

6. The holder as recited in claim 1, wherein the plate is serrated to prevent slippage of a tooth.

7. The holder as recited in claim 1, wherein the plate includes an engraved ruler extending from the first side wall to the second side wall.

8. The holder as recited in claim 1, wherein the plate includes an engraved ruler extending parallel to the first side wall and the second side wall.

* * * * *